US011972256B2

(12) United States Patent
Kedia et al.

(10) Patent No.: US 11,972,256 B2
(45) Date of Patent: Apr. 30, 2024

(54) SOFTWARE CODE ANALYSIS USING FUZZY FINGERPRINTING

(71) Applicant: International Business Machines Corporation, Armonk, NY (US)

(72) Inventors: Yash Kedia, Redmond, WA (US); Siddharth Mehta, New York, NY (US); Matthias Seul, Pleasant Hill, CA (US); Michael Wang, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 17/651,270

(22) Filed: Feb. 16, 2022

(65) Prior Publication Data

US 2023/0259360 A1    Aug. 17, 2023

(51) Int. Cl.
*G06F 8/75* (2018.01)
*G06F 8/41* (2018.01)
*G06F 8/71* (2018.01)
*G06F 16/901* (2019.01)
*G06F 18/22* (2023.01)
*G06N 7/02* (2006.01)

(52) U.S. Cl.
CPC ............... *G06F 8/75* (2013.01); *G06F 8/433* (2013.01); *G06F 8/71* (2013.01); *G06F 16/9024* (2019.01); *G06F 18/22* (2023.01); *G06N 7/026* (2013.01)

(58) Field of Classification Search
None
See application file for complete search history.

(56) References Cited

U.S. PATENT DOCUMENTS

| | | | |
|---|---|---|---|
| 7,386,831 B2 | 6/2008 | Flanagan | |
| 8,479,161 B2* | 7/2013 | Weigert | G06F 8/75 |
| | | | 717/124 |
| 9,218,466 B2 | 12/2015 | Rogers et al. | |
| 9,330,095 B2 | 5/2016 | Fedorenko et al. | |
| 9,459,861 B1 | 10/2016 | Rogers et al. | |
| 9,851,959 B2 | 12/2017 | Edler Von Koch | |
| 9,910,985 B2 | 3/2018 | Cohen | |
| 10,331,441 B2 | 6/2019 | Carmack et al. | |
| 10,474,456 B2 | 11/2019 | Bezzi et al. | |
| 11,308,269 B1* | 4/2022 | Rodgers | G06F 16/93 |
| 2007/0006160 A1 | 1/2007 | Kunz et al. | |
| 2008/0263669 A1* | 10/2008 | Alme | G06F 21/56 |
| | | | 726/24 |

(Continued)

OTHER PUBLICATIONS

Stein, Benno, and Sven Meyer zu Eissen. "Fingerprint-based similarity search and its applications." Universität Weimar (2007): 85-99. (Year: 2007).*

(Continued)

*Primary Examiner* — Jason D Mitchell
(74) *Attorney, Agent, or Firm* — Kimberly S. Zillig (57) ABSTRACT

A system for determining code ancestry. The system includes: a memory; and a processor communicatively coupled to the memory. The processor is configured to perform a method comprising: receiving a source code file; parsing a plurality of functions out of the source code file; generating fuzzy fingerprints from the plurality of functions; and storing the fuzzy fingerprints in a graph database.

17 Claims, 9 Drawing Sheets

(56) References Cited

U.S. PATENT DOCUMENTS

| | | | |
|---|---|---|---|
| 2010/0242028 A1* | 9/2010 | Weigert | G06F 21/105 |
| | | | 717/131 |
| 2012/0317421 A1 | 12/2012 | Gounares | |
| 2014/0075004 A1 | 3/2014 | Van Dusen et al. | |
| 2014/0188986 A1* | 7/2014 | Levy | G06F 21/562 |
| | | | 709/203 |
| 2016/0094564 A1* | 3/2016 | Mohandas | H04L 63/145 |
| | | | 726/24 |
| 2017/0147291 A1* | 5/2017 | Vega | G09B 19/0053 |
| 2020/0026511 A1* | 1/2020 | Swierc | G06N 20/00 |
| 2020/0218535 A1 | 7/2020 | Alomari | |
| 2020/0226253 A1* | 7/2020 | Lancioni | G06F 16/122 |
| 2021/0240825 A1* | 8/2021 | Kutt | G06F 8/42 |
| 2022/0207140 A1* | 6/2022 | Mooney, III | G06F 21/563 |
| 2023/0195595 A1* | 6/2023 | Otoshi | G06F 8/75 |
| | | | 717/131 |

OTHER PUBLICATIONS

Rosa, Hugo & Batista, Fernando & Carvalho, Joao. (2014). Twitter Topic Fuzzy Fingerprints. 776-783. 10.1109/FUZZ-IEEE.2014.6891781. (Year: 2014).*

H. Rosa, F. Batista and J. P. Carvalho, "Twitter Topic Fuzzy Fingerprints," 2014 IEEE International Conference on Fuzzy Systems (FUZZ-IEEE), Beijing, China, 2014, pp. 776-783, doi: 10.1109/FUZZ-IEEE.2014.6891781. (Year: 2014).*

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

SOFTWARE CODE ANALYSIS USING FUZZY FINGERPRINTING

BACKGROUND

The present disclosure relates generally to software package development, and more particularly to software analysis using fuzzy fingerprinting to determine code ancestry.

Software development organizations often employ a common code base, or source code repository, that can include hundreds or thousands of packages used in the development of various software products. Portions of the software packages can be re-used in future-developed software programs. Understanding the ancestry of portions of code can be important in software development.

SUMMARY

According to some embodiments of the disclosure, there is provided a system for determining code ancestry. The system includes: a memory; and a processor communicatively coupled to the memory. The processor is configured to perform a method comprising: receiving a source code file; parsing a plurality of functions out of the source code file; generating fuzzy fingerprints from the plurality of functions; and storing the fuzzy fingerprints in a graph database.

According to some embodiments of the disclosure, there is provided a computer program product for software analysis using fuzzy fingerprinting to determine code ancestry, the computer program product comprising one or more computer readable storage media having program instructions embodied therewith. The program instructions are executable by a device to cause the device to: receive a source code file of a computer program; parse a plurality of functions out of the source code file; generate fuzzy fingerprints from the plurality of functions; and store the fuzzy fingerprints in a graph database.

According to some embodiments of the disclosure, there is provided a method for determining code ancestry. The method comprises: receiving a source code file; parsing a plurality of functions out of the source code file; generating fuzzy fingerprints from the plurality of functions; and storing the fuzzy fingerprints in a graph database.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to the field of software package development, and in particular to a system and method for determining code ancestry using fuzzy fingerprinting of computer program components. While the present disclosure is not necessarily limited to such applications, various aspects of the disclosure can be appreciated through a discussion of various examples using this context.

Software development organizations often employ a common code base, or source code repository, that can include hundreds or thousands of packages used in the development of various software products. The packages in the code base can often further contain hundreds, thousands, or even millions of source files. The source files can be re-used in future-developed software programs. However, if there was a problem with code in an original source file, it can extend to future programs that incorporate that source file. Often the name of a source file is changed from the name originally given, so efficient identification of the original source file might not be possible. Further, packages in the code base can additionally contain hundreds, thousands, or even millions of source files that might be subject to different open source licenses. Ensuring license compliance and compatibility for all of the software in a given product can be very difficult, as open source software typically originates from one or more upstream repositories.

Modern version control systems offer a method of managing and maintaining code edit history for multiple files and directories. However, there is currently no mechanism to track changes across temporal and spatial boundaries. In particular, there does not currently exist a solution to track related or derived code that moves across files and that exists across temporal commits.

One feature and advantage of the disclosed process and system is to provide a mechanism to solve a problem of identifying a file from a source code base that is being used in another program. A goal of the disclosure is to create a map or graph of code by creating function level fingerprints. The code is fingerprinted in its source form. The fingerprints of source code and other code can be compared and a similarity measurement can be made in order to, at least, reduce the number of possible source code files to a reasonable, reviewable number that might have been used in another program. The similarity measurement can be made, even with evolution of the source code files, on multiple revisions of a source code file.

Another feature and advantage of the disclosed process and system is to identify an ancestry or history of a source code file or a portion of source code in order to get context for the file and to see how the source code file has evolved over time. If there are any issues or problems with later use of the source code file, being able to examine its history can help to address those issues or problems.

Yet another feature or advantage of disclosed processes and systems is that they can be used to identify if source code is used in another program by another company without permission, for example. Identifying stolen code, or that which might be subject to a license agreement, is important.

Embodiments described in the disclosure provide a process and system that determine ancestry and similarity of code across a codebase by quantizing the code at a functional level and comparing similar fuzzy fingerprints via a graph database. The system represents a program not as a set of files, but rather as a set of functions which exist as a part of an entire software ecosystem. These functions and their associated structural data are represented as fuzzy fingerprints and stored in a graph database, which allows the system to determine the movement and changes in a specific function across temporal and spatial boundaries by juxtaposing an index of similarity with a predetermined threshold.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
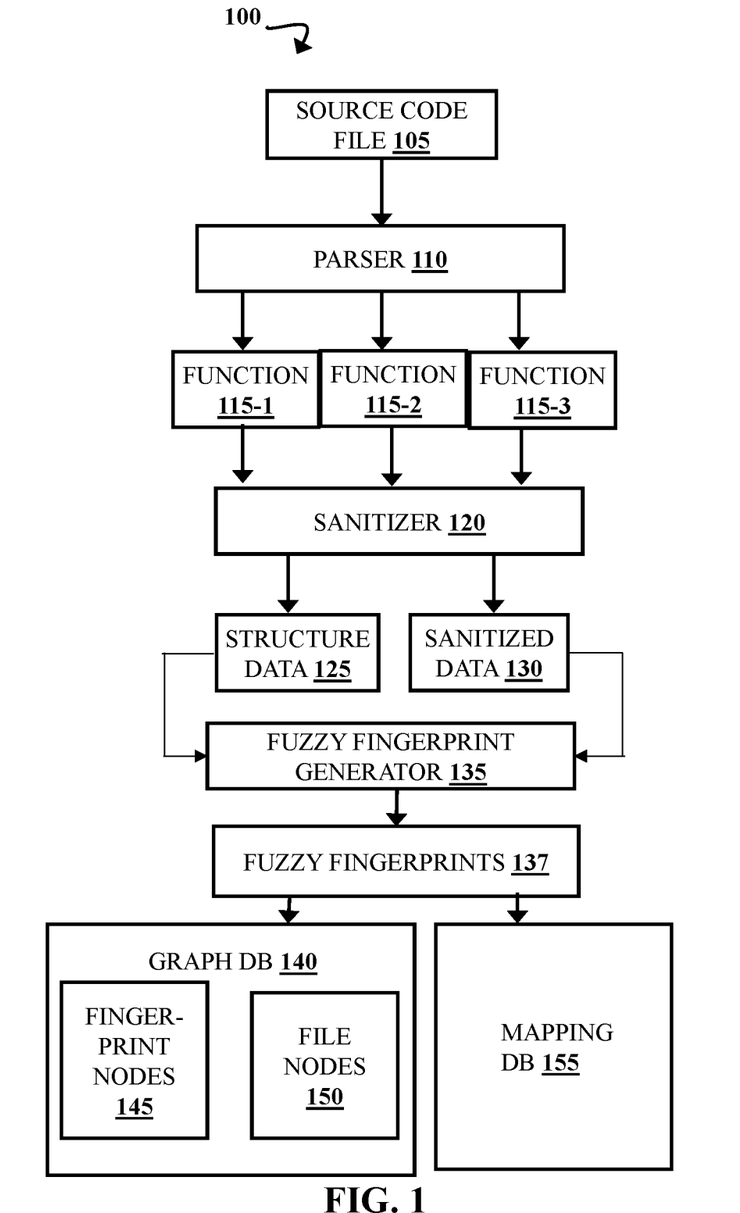
FIG. 1 is a block diagram illustrating a system for determining code ancestry by using fuzzy fingerprint generation, according to some embodiments of the present disclosure.

Turning now to the figures, FIG. 1 is a block diagram illustrating a system 100 for determining code ancestry using fuzzy fingerprinting of program components, in accordance with one embodiment. As shown, system 100 includes a source code file 105, a parser 110 that parses out functions 115-1, 115-2, 115-3 from source code file 105, a sanitizer 120 that produces structure data 125 and sanitized data 130, a fuzzy fingerprint generator 135 that generates fuzzy fingerprints 137, a graph database 140 that can include fingerprint nodes 145 and file nodes 150, and a mapping database 155.

In computer science, the term "source code" refers to a collection of computer instructions written using some human-readable computer language, usually as text. The source code of a computer program is specially designed to facilitate the work of computer programmers (also referred to herein as "software developers" or simply "developers"), who specify the actions to be performed by a computer mostly by writing source code. Some source control systems enable descriptive information about source code to be stored in association with the source code. This descriptive information about source code can be referred to as "metadata." Such metadata is typically associated with a source code file, or group of files. Developers sometimes embed comments within their source code. Such comments can be used to provide historical information about the source code, describe the purpose of certain functionality within the source code, explain entity naming conventions used within the source code, or the like. Such comments can also be considered a form of metadata associated with source code.

In system 100 of FIG. 1, source code file 105 is provided to or received by system 100. Parser 110 then parses the source code file 105. The parser 110 can recognize a filetype and a programming language used in the source code file 105, and it can recognize those from a file extension and metadata, for example. The parser 110 can parse out functions 115-1, 115-2, 115-3, for example, from source code file 105. The functions 115-1, 115-2, 115-3 can be identified with metadata, or can be identified, for example, with static code analysis without any metadata. The functions 115-1, 115-2, 115-3 are then passed to a sanitizer 120. Although three functions 115-1, 115-2, 115-3 are shown and described, any suitable number of functions (i.e., n functions, where n is any positive integer) is contemplated by the disclosure.

Next, in system 100 of FIG. 1, sanitizer 120 receives, and sanitizes, parsed functions 115-1, 115-2, 115-3 received from parser 110. The sanitizer 120 uses specific detection, such as detected languages to apply specific filtering to each function. It can also use this to do approximate origin matching, e.g., preferring matches coming from the same program language family (e.g., C++ and C vs. Python). The sanitizer 120 can strip all unnecessary components from the file, including, but not limited to, comments, keywords and delimiters, which are dependent upon the program language being used. The sanitizer 120 can use specific off-the-shelf components that are commonly used for "code limiting," "code folding," and "code structure analysis," which are found in modern development environments, in order to isolate specific areas of code. The sanitation process produces two datums: one which relates to structure of the parsed function, referred to as "structure data" 125; and another that relates to sanitized text of the parsed function, referred to as "sanitized data" 130.

Figure 2:
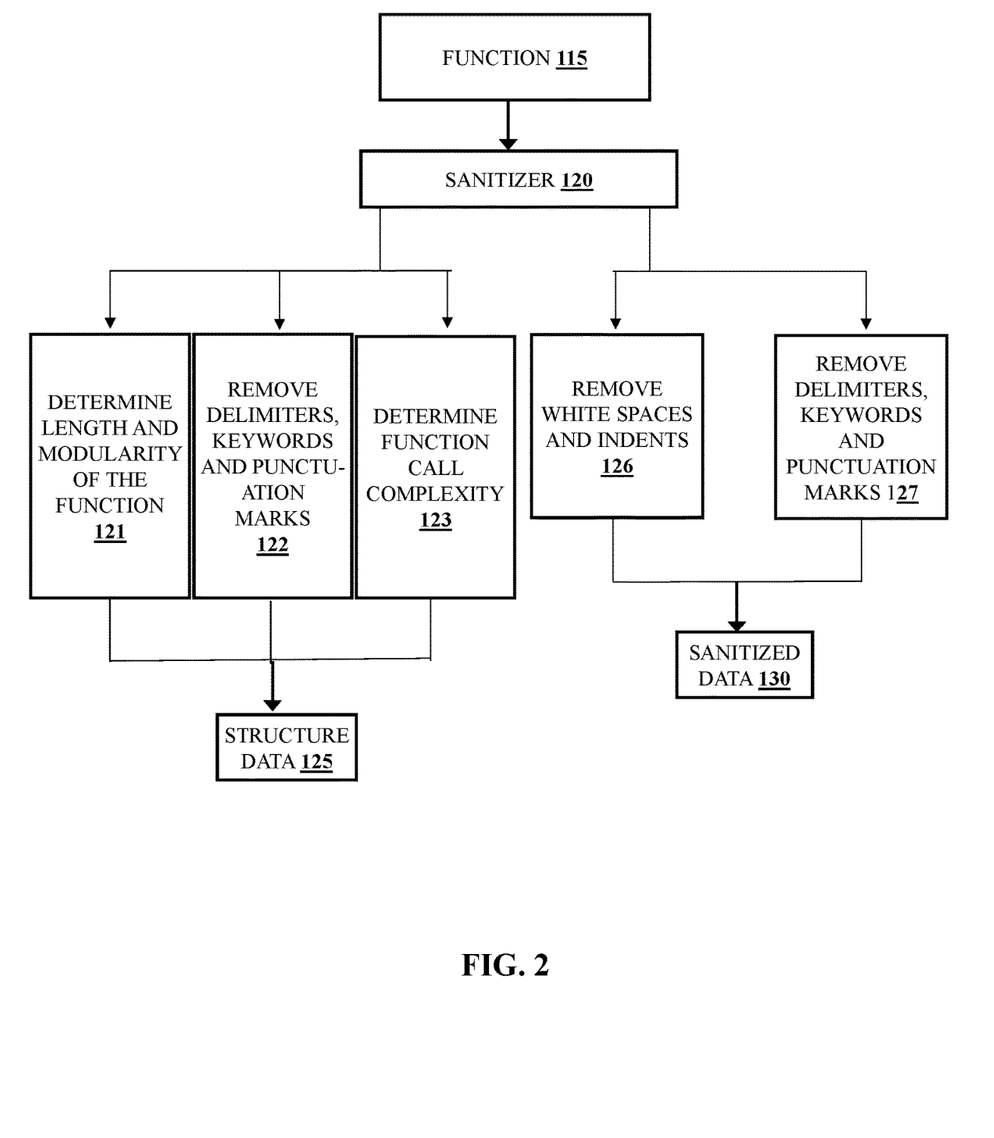
FIG. 2 is a block diagram illustrating further detail of the system of FIG. 1, according to some embodiments of the present disclosure.

FIG. 2 shows more detail of system 100 relating to the sanitizer 120, in particular. Function 115 is provided to the sanitizer 120. Sanitizer 120 can strip unnecessary components in function 115 in order to produce structure data 125 and sanitized data 130. Sanitizer 120 can perform tasks to produce structure data 125, which are, for example, to: determine length and modularity of the function 121; remove delimiters, keywords, and punctuation marks 122; and determine function call complexity 123. Function call complexity is determined by things that are happening in the function. For example, function call complexity can be determined by: raw number of instructions; complexity of decision trees (if/else); number of other functions called; and, number of data structures and memory allocated/freed. Sanitizer 120 can also perform tasks to produce sanitized data 130, which, for example, are to: remove white spaces and indents 126; and remove delimiters, keywords and punctuation marks 127. Other suitable tasks are possible in order to produce structure data 125 and/or sanitized data 130, and are contemplated by the disclosure.

Structure data 125 can represent an original structure of code from a source code file 105 (FIG. 1), which has been parsed. Structure data 125 can still contain styling of the function 115 from which it arose that can include, e.g., spacing, tabs, delimiting characters (such as semicolons, curly braces, etc.) braces, numbers of times the function has been called, etc. Using components, such as a "coding linter," can allow the structure data 125 to detect a certain preference for coding styles used (or lack thereof), including switches and changes in coding style. The coding linter (not shown) can also be trained on sample sets to derive a specific "house style" of a given program development team. The coding linter can also be trained using multiple data sets from different times, e.g., taking a sample of a representative code snipped over a course of different years. Structure data 125 can generally be a skeleton of the function 115 from which it arose.

Sanitized data 130 is data produced by the sanitizer 120 that is not included in the structure data 125. The sanitized data 130 contains the essence of the function (115-1, 115-2 or 115-3) as written without the formalities of language surrounding it. The "noise" can be removed in sanitized data. With most of the formal language and operators provided by the program language removed or cleaned out, what remains is a specific collection of variable names, function calls, references and inclusions. The function (115-1, 115-2, or 115-3) can be abstracted into unique contributions of individuals that wrote the code.

Returning to FIG. 1, structure data 125 and sanitized data 130 can be obtained from sanitizer 120 and passed to fuzzy fingerprint generator 135 in order to create a fuzzy fingerprint signature for both the structure data 125 and the sanitized data 130 for one particular function (115-1, 115-2 or 115-3). A previously known fuzzy fingerprint generator can be used in system 100, or a custom-tailored component can be designed and used. Fuzzy fingerprint generator 135 can allow source patterns of similar styles to yield a signature "match." The performance of a fingerprint generator (or signature generator) can use any relevant technique (e.g., hashing). An advantage of using fuzzy fingerprint generator 135, instead of heuristics and structural analysis, is that fuzzy fingerprint generation is faster and is a systemic approach. Optionally, however, heuristics and structural analysis can be used in addition to, or instead of, the fuzzy fingerprint generator 135 in system 100.

Once fuzzy fingerprints 137 are generated by fuzzy fingerprint generator 135, they are stored in graph database 140. Fuzzy fingerprints 137 are taken on both the structure data 125 and the sanitized data 130, and are treated as related/connected elements of the same origin. The fuzzy fingerprints 137 of both the structure data 125 and the sanitized data 130 can be used to potentially recognize a re-use of one or more of the functions 115-1, 115-2, 115-3 in a current program or other code.

Graph database 140 can store and compare the fuzzy fingerprints 137. A graph-traversing algorithm, for example, can be used by graph database 140 to identify temporal and spatial relationships between the functions 115-1, 115-2, 115-3. The graph database can generate a graph from the temporal and spatial relationships using the graph-traversing algorithm. The graph database 140 can calculate similarities to identify if the functions 115-1, 115-2, 115-3 from source code file 105, or portions thereof, are similar to other code. A similarity threshold can be in place by which to identify those functions that are similar enough to be flagged for additional review, for example. The graph database 140 allows the source code file 105 to be compared to old source code and a potential "code ancestry" or "code evolution" can then be established.

In some embodiments, fingerprints can be generated from another source code file, or from other source code. Those fingerprints are then compared to fingerprints that are generated from structure data and sanitized data from file nodes.

Apart from the graph database 140 which maps the relationship between various fingerprints and files, a secondary database, such as mapping database 155, can be used to store the mapping between the fingerprints 137, the sanitized data 130, the structure data 125 and the source code file 105. The purpose of the mapping database 155 can be to provide product and integration functionality for the system 100.

An advantage to identifying similarity of fingerprints of current code to files of older code is that a smaller segment of possible ancestors for a current program can be identified by selection of old source code files having a threshold amount of similarity to current code. A human (or computer system) can, for example, review a small number of potential source code files (e.g., provided in a report and/or a graphical representation) that are similar to find a potential ancestor to current code in order to possibly help solve a problem with the current code. On the other hand, a review of all of the thousands of possible source code files in a code base for exact source code, without similar files being first identified, would be impossible for a human to complete in a reasonable amount of time and, at the very least, be computationally expensive for a computer system to perform.

Identifying the code ancestry of a current program can allow a developer of the current program (or a computer system) to go back in time and identify a first version of source code, for example, present in the current code. The developer/computer could potentially then identify the authors of the source code, read check-in comments, look at any tickets for problems associated with the code, and/or examine any modifications that were done to the code, for example. In addition, the developer/computer could perform a forward look-up from a first version and could find sibling codes that can possibly include fixes, etc. Overall, the "code ancestry" can be developed in such a way, and can assist in development of new programs.

Two kinds of nodes can be stored in graph database 140, which are fingerprint nodes 145 and file nodes 150. Fingerprint nodes 145 each represent a singular fuzzy fingerprint 137 generated in a previous process operation by the fuzzy fingerprint generator 135. Since each fuzzy fingerprint 137 is generated on a function scope at a particular instance in time each fingerprint node 145 represents a function at a specific instance in time via its fuzzy fingerprint agnostic of its location in codebase. File nodes 150 each represent a minimalistic view of the source code file 105. File nodes 150 can map fingerprints 137 to source code file 105 by connecting various fingerprint nodes 145. A spatial mapping of the functions 115-1, 115-2, 115-3 from source code file 105 can be created across a source codebase. File nodes 150 can come from source code. A location of where file nodes 150 can be sourced from can be made, such as from a hard disk, for example. Other implementations of file nodes 150 can be pulled as data from a source code repository, such as GITHUB®, for comparison.

Figure 3:
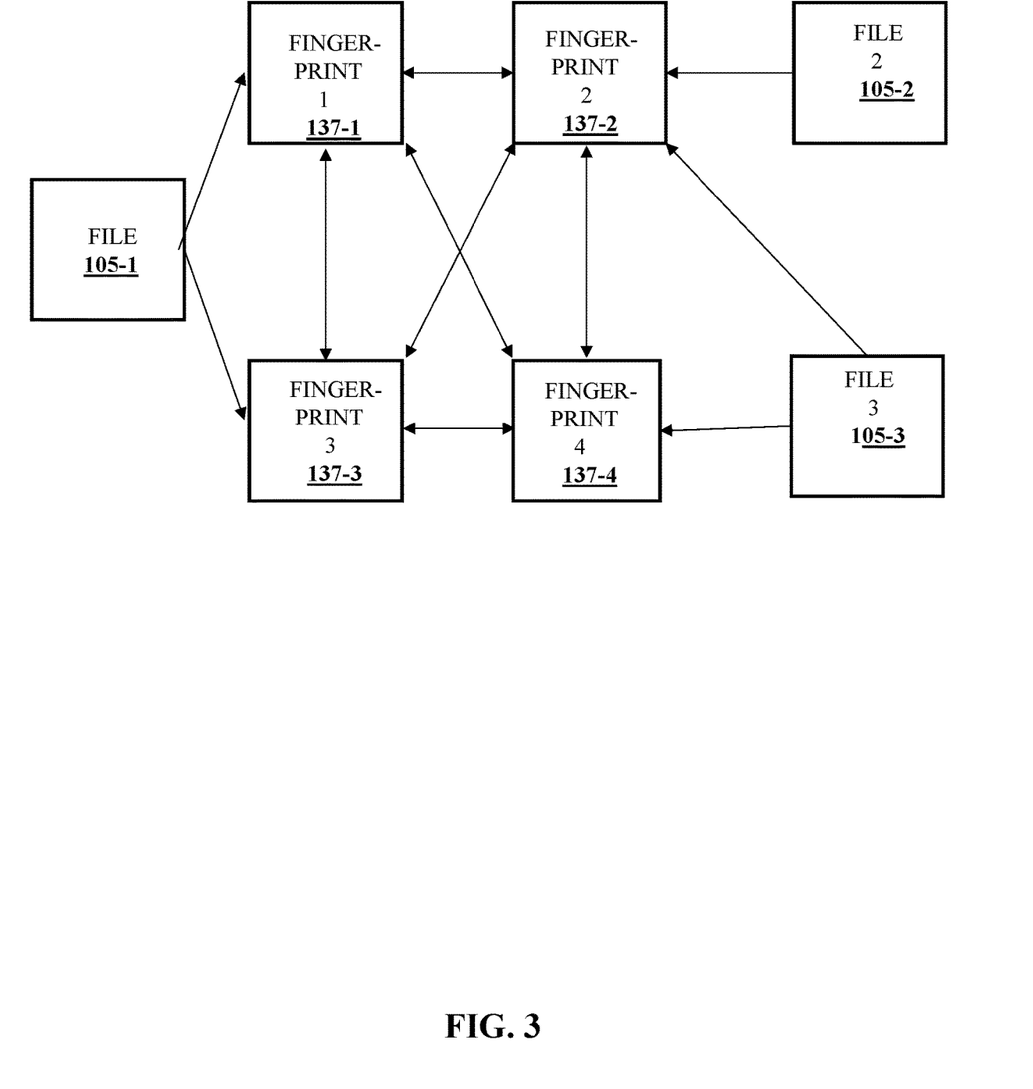
FIG. 3 is a block diagram illustrating further detail of the system of FIG. 1, according to some embodiments of the present disclosure.

FIG. 3 illustrates how file ancestry can be discovered and mapped between different files. In the example shown in FIG. 3, File 1 105-1 is scanned resulting in Fingerprint 1 137-1 and Fingerprint 3 137-3. Also File 2 105-2 is scanned, resulting in Fingerprint 2 137-2. Lastly File 3 105-3 is scanned, resulting in Fingerprint 2 137-2 and Fingerprint 4 137-4. Since File 2 105-2 and File 3 105-3 both yield Fingerprint 2 137-2, they share at least a portion of the same code and are, therefore, related.

Beyond direct matches of code, embodiments of the disclosure can also look for indirect relationships by comparing one fingerprint to another fingerprint. In such embodiments, fuzzy matching is applied, allowing a determination of whether a given code portion is a variation or a derivative work of another portion of code. FIG. 3 illustrates the comparison of Fingerprint 1 137-1, Fingerprint 2 137-2, Fingerprint 3 137-3, and Fingerprint 4 137-4. By performing the fuzzy matching between fingerprints, indirect relationships can be established between files. For example, as in FIG. 3, it is shown that File 1 105-1 is related to File 2 105-2, by virtue of using code that yielded Fingerprint 1 137-1 which is related/derived from Fingerprint 2 137-2, which in turn is part of File 2 105-2. By tuning such a fuzzy matcher configuration and thresholds, one can ensure only functions/code pieces/structures that are closely related are considered a match, avoiding false positives if a specific code pattern or standard is re-used.

Relationships within a single or multiple code repositories can potentially be identified by comparing File 1 105-1, File 2 105-2, and File 3 105-3 from the same point in time. This can help discover how code may have migrated and been incorporated. Such code repositories can be of the same technology (e.g., all GITHUB®) or can use mixed providers (e.g., GITHUB®, StarTeam and Subversion (SVN)). Furthermore, it is possible that File 1 105-1, File 2 105-2 and File 3 105-3 can be from different points in time. For example, File 1 105-1 and File 2 105-2 could be the same file but from code bases that are months apart in time. As embodiments of the disclosures use pattern- and structure-based fingerprints and examine parts of code, rather than entire files, this makes it possible to determine relationships even if, for example, File 2 105-2 has a different name and slightly different composition than other files. This allows the detection of code that was moved/copied between projects, or extracted into a standalone component to be re-used in multiple places.

There can be two kinds of edges in a graph that correspond to the two kinds of nodes (fingerprint nodes 145 and file nodes 150) in the system 100. Those skilled in the art will recognize that in a call graph each function is commonly referred to as a node and the connections between functions are commonly referred to as "edges." A first edge is fingerprint node to file node, and a second edge is fingerprint node to fingerprint node. Edges from file nodes 150 to fingerprint nodes 145 represent a relationship that the fingerprint 137 contained in the fingerprint node 145 was created on one function (115-1, 115-2, or 115-3) from the source code file 105 that file node 150 represents. In cases where a "Don't Repeat Yourself" (DRY) principle is followed, multiple file nodes 150 should not map to the same fingerprint node 145. However, such edges can exist. Edges from fingerprint nodes 145 to fingerprint nodes 145 represent a similarity relationship between the fingerprints 137 that each node represents. There are a few situations in which these edges can be prepared, with two being most applicable. A first situation is one in which an edge exists between two nodes, n1 and n2 (both fingerprint nodes), if and only if similarity is greater than a predefined threshold of similarity. A second situation is one in which an edge always exists between two nodes, n1 and n2, where the value associated with the edge is the output of similarity (of two fingerprint nodes). Using a graph generated via these parameters, temporal and spatial relationships can be generated between similar functions using graph-traversing algorithms.

In some embodiments, the system described herein can be a multi-user mainframe computer system, a single-user system, or a server computer or similar device that has little or no direct user interface but receives requests from other computer systems (clients). Further, in some embodiments, the disclosed system can be implemented as a desktop computer, portable computer, laptop or notebook computer, tablet computer, pocket computer, telephone, smart phone, network switches or routers, or any other appropriate type of electronic device.

It is noted that FIG. 1 is intended to depict the representative major components of example system 100. In some embodiments, however, individual components can have greater or lesser complexity than as represented in FIG. 1. Components other than or in addition to those shown in FIG. 1 can be present, and the number, type, and configuration of such components can vary.

Figure 4:
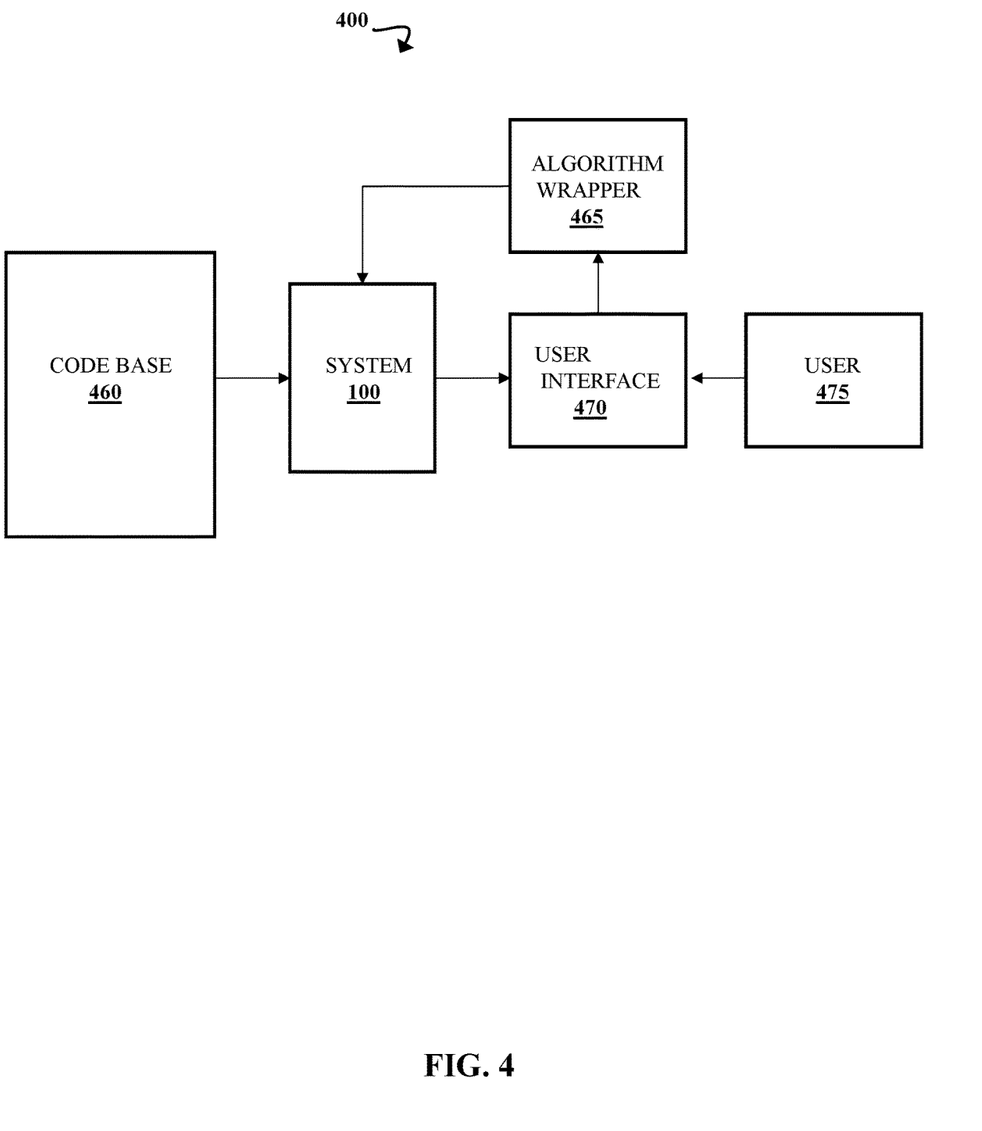
FIG. 4 is a block diagram illustrating an example broader system including the system of FIG. 1, according to some embodiments of the present disclosure.

FIG. 4 illustrates a broader system 400 that incorporates system 100 described herein above. Code base 460 provides the source code from which the source code file 105 is pulled and provided to system 100. An algorithm wrapper 465 can be written in order to be run in system 100. An algorithm wrapper is an intermediary layer that allows mapping of different languages and dialects to the same general concepts, and allows an actual meaning of code parts to be abstracted from its specific grammar and language. Such an abstraction is both important during evaluation and when trying to make code useable for a graphical interface, as parts of code need to be classified and generalized. The ability to abstract the general meaning of a part of code also allows for detection of "ports." Such ports are for porting code from one language or dialect to another. Many different algorithms are possible to be included in algorithm wrapper 465 and used to run system 100. A user interface 470 is shown that can interact with algorithm wrapper 465 and system 100. Results from system 100 can be displayed on user interface 470, for example. A user indicated by 475 is shown that can interact with the user interface 470.

Figure 5:
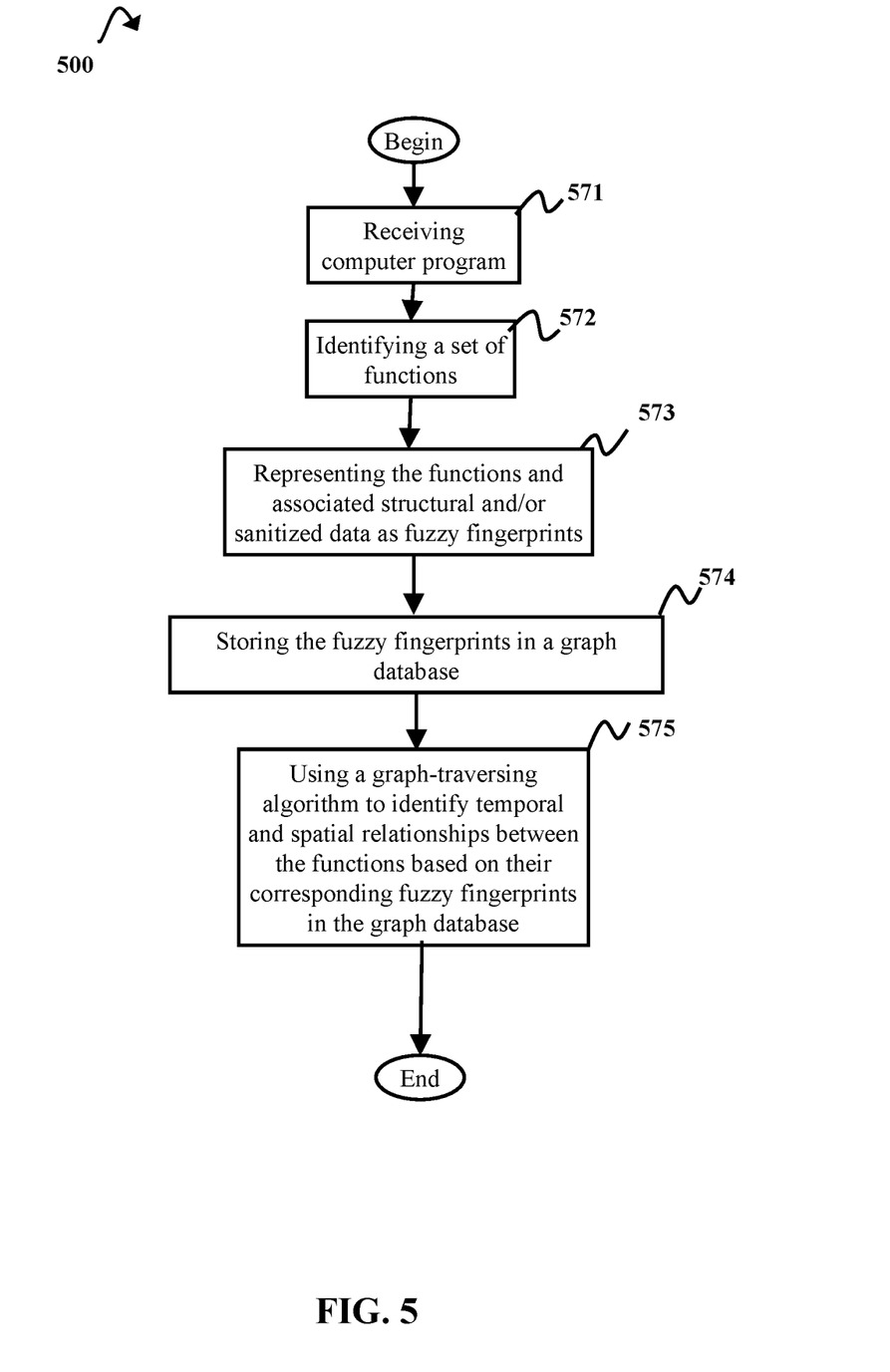
FIG. 5 is a flow diagram illustrating a process of determining code ancestry by using fuzzy fingerprint generation, according to some embodiments of the present disclosure.

Another particular embodiment will now be described by way of example and without limitation. FIG. 5 is a flow diagram of an example method or process 500 for determining code ancestry using fuzzy fingerprinting of computer program components. Components used in the method 500 are described herein above. A first process operation of method 500 is receiving a computer program, illustrated as process operation 571. Next, is process operation 572, which is identifying a set of functions that comprise the computer program. Shown at 573 is a process operation of representing the functions and associated structural and/or sanitized data as fuzzy fingerprints. Next is process operation 574, which is storing the fuzzy fingerprints in a graph database. Shown at 575 is a process operation of using a graph-traversing algorithm to identify temporal and spatial relationships between the functions based on their corresponding fuzzy fingerprints in the graph database. Another particular embodiment of the disclosure is a computer program product for software analysis using fuzzy fingerprinting to determine code ancestry, the computer program product comprising a computer readable storage medium having program instructions embodied therewith that are executable by a device to cause the device to perform the process operations in FIG. 5, for example.

Figure 6:
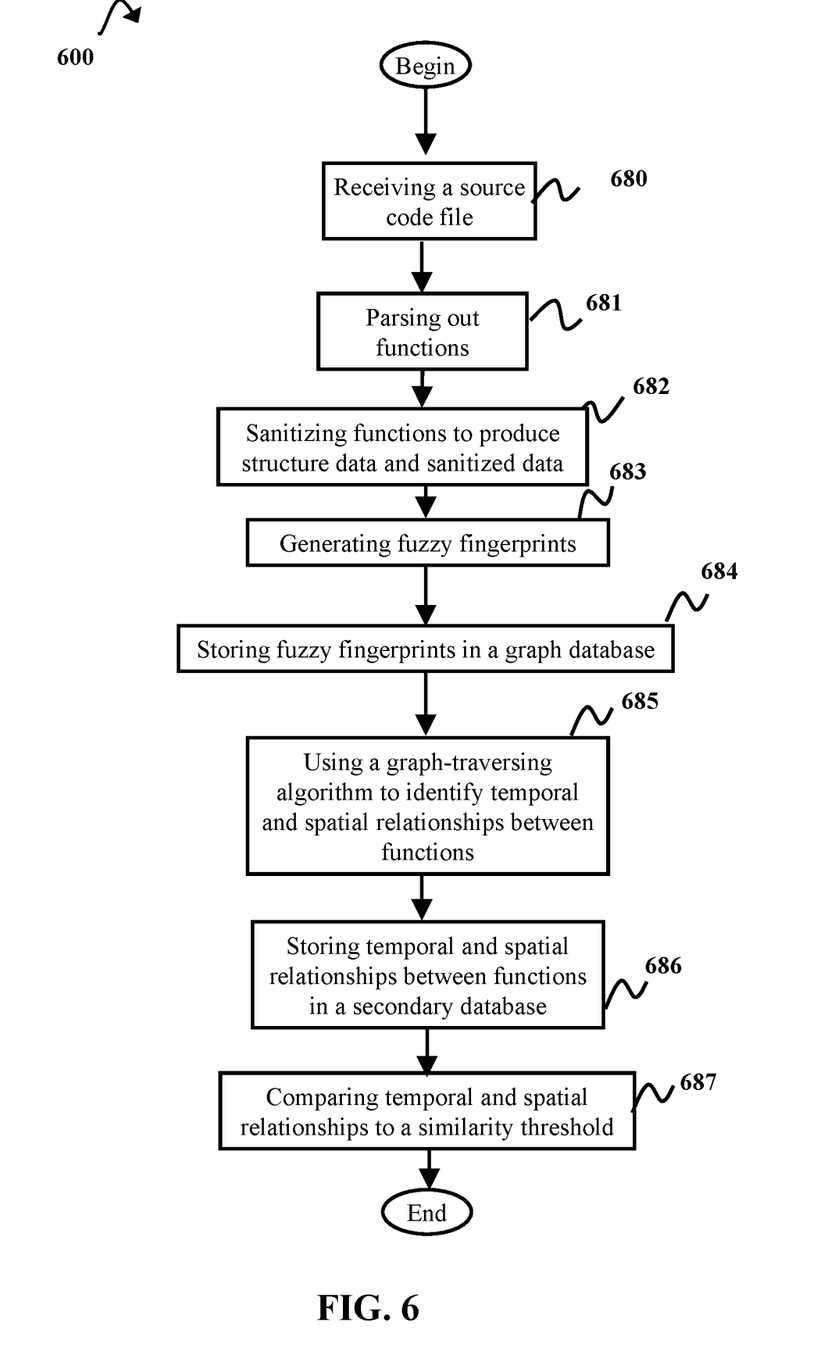
FIG. 6 is a flow diagram illustrating a process of determining code ancestry by using fuzzy fingerprint generation, according to some embodiments of the present disclosure.

FIG. 6 illustrates another example process 600 for determining code ancestry using fuzzy fingerprinting of computer program components. An example first process operation is for a system, such as system 100 described herein, receiving a source code file 680. Next, process operation 681 is parsing functions out of the source code file. A next process operation 682 is sanitizing the functions to produce structure data and sanitized data. Next is generating fuzzy fingerprints from the structure data and sanitized data, as illustrated by process operation 683. A next operation in the process 684 is storing the fuzzy fingerprints in a graph database. A further process operation 685, is using a graph-traversing algorithm to identify temporal and spatial relationships between the functions. Next is an optional process operation 686, which is storing the temporal and spatial relationships between functions in a secondary databased. Finally, another optional process operation 687 is comparing temporal and spatial relationships to a similarity threshold.

In some embodiments, the data storage and retrieval processes described herein could be implemented in a cloud computing environment, which is described below with respect to FIGS. 7 and 8. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but might be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
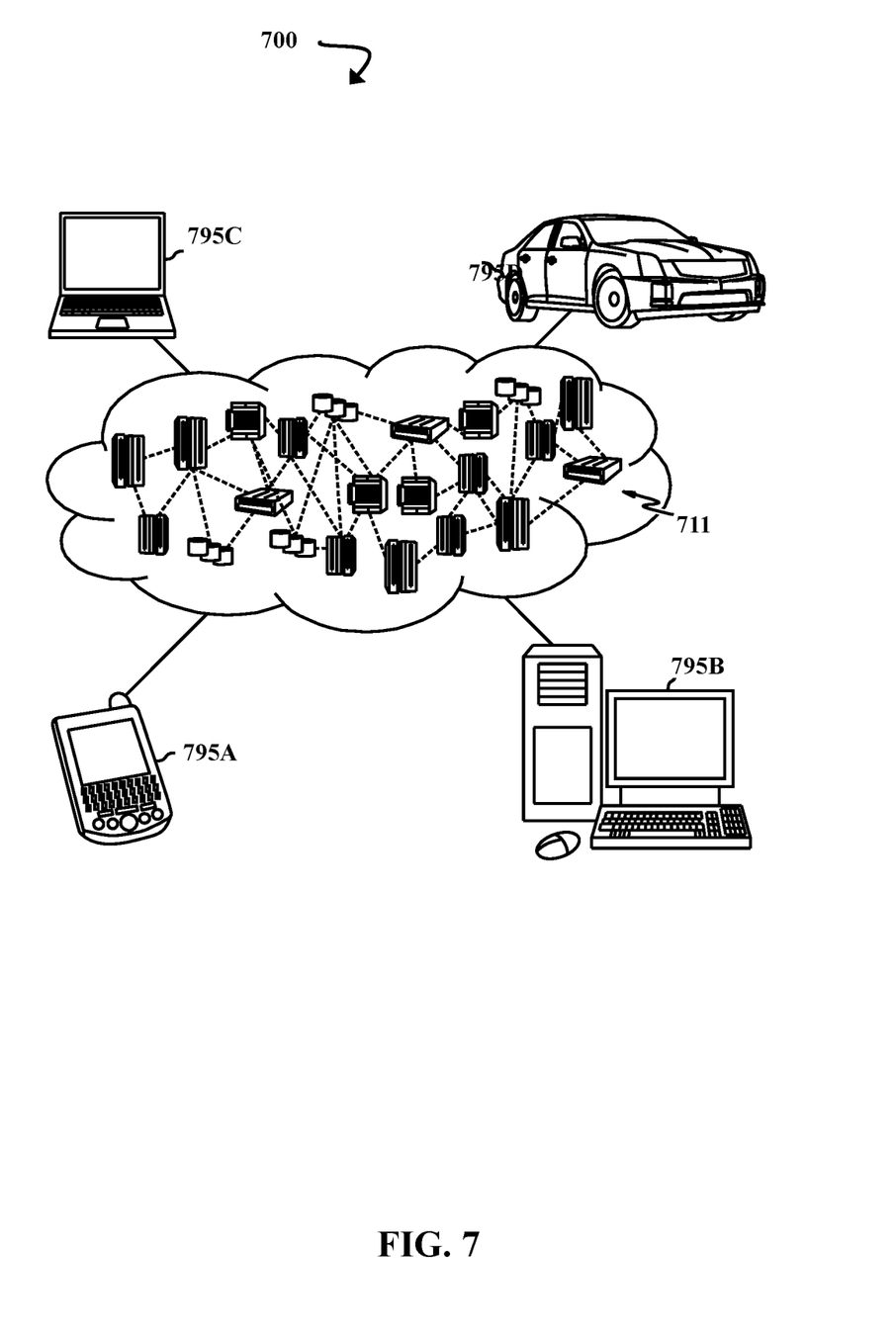
FIG. 7 is a block diagram illustrating a cloud computing environment, according to some embodiments of the present disclosure.

FIG. 7 is a block diagram illustrating a cloud computing environment 700, according to some embodiments of the present disclosure. As shown, cloud computing environment 700 includes one or more cloud computing nodes 711 with which local computing devices used by cloud consumers, such as, for example, personal digital assistant (PDA) or cellular telephone 795A, desktop computer 795B, laptop computer 795C, and/or automobile computer system 795D can communicate. Nodes 711 can communicate with one another. They can be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 795A-795D shown in FIG. 7 are intended to be illustrative only and that computing nodes 711 and cloud computing environment 700 can communicate with any type of computerized device over any type of network and/or network addressable connection (e.g., using a web browser).

Figure 8:
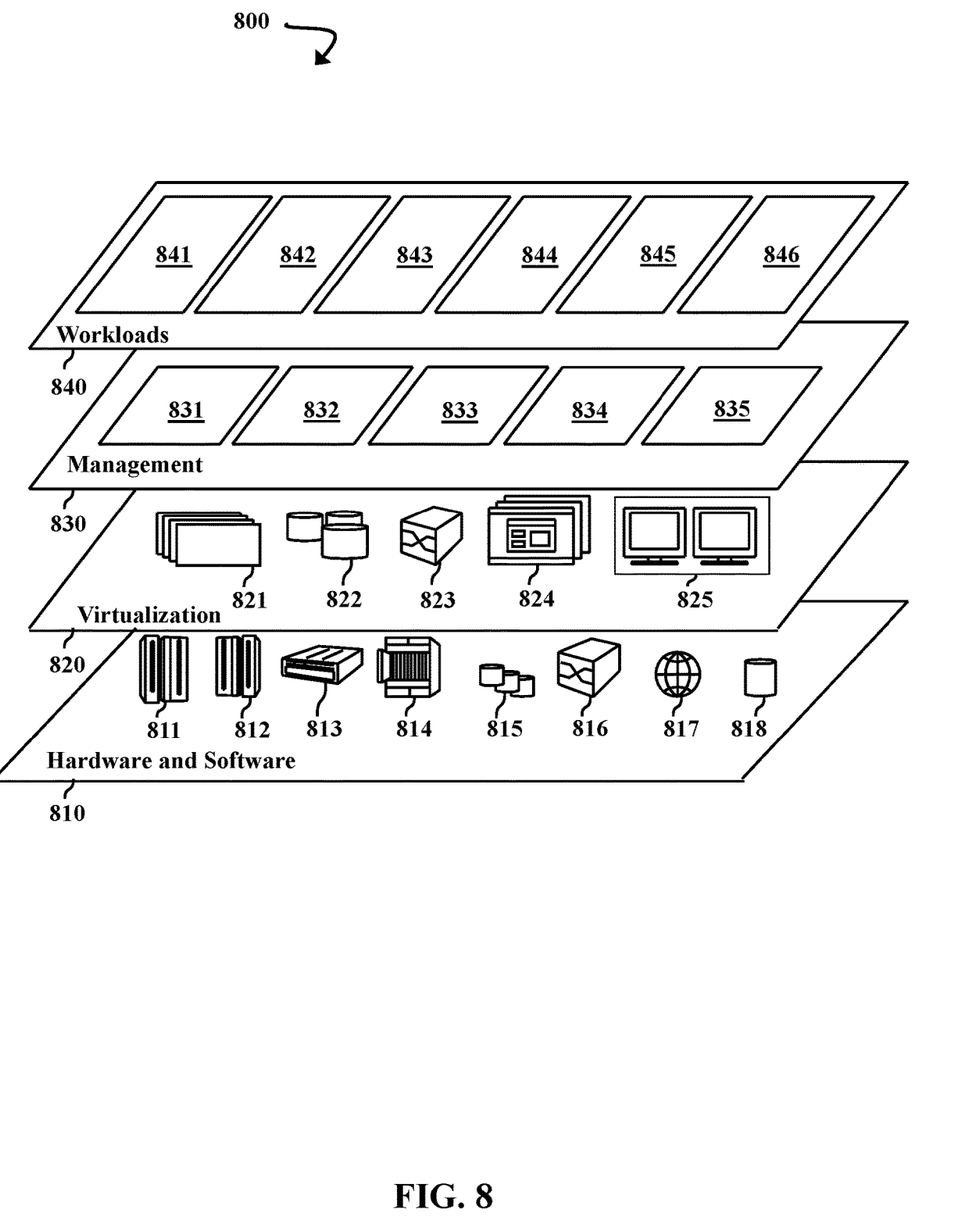
FIG. 8 is a block diagram illustrating a set of functional abstraction model layers provided by the cloud computing environment, according to some embodiments of the present disclosure.

FIG. 8 is a block diagram illustrating a set of functional abstraction model layers 800 provided by the cloud computing environment 700, according to some embodiments of the present disclosure. It should be understood in advance that the components, layers, and functions shown in FIG. 8 are intended to be illustrative only and embodiments of the disclosure are not limited thereto. As depicted, the following layers and corresponding functions are provided:

Hardware and software layer 810 includes hardware and software components. Examples of hardware components include: mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities can be provided: virtual servers 821; virtual storage 822; virtual networks 823, including virtual private networks; virtual applications and operating systems 824; and virtual clients 825.

In one example, management layer 830 provides the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment can be utilized. Examples of workloads and functions that can be provided from this layer include: mapping and navigation 841; software development and lifecycle management 842; virtual classroom education delivery 843; data analytics processing 844; transaction processing 845; and function fingerprinting and code ancestry determination 846.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Figure 9:
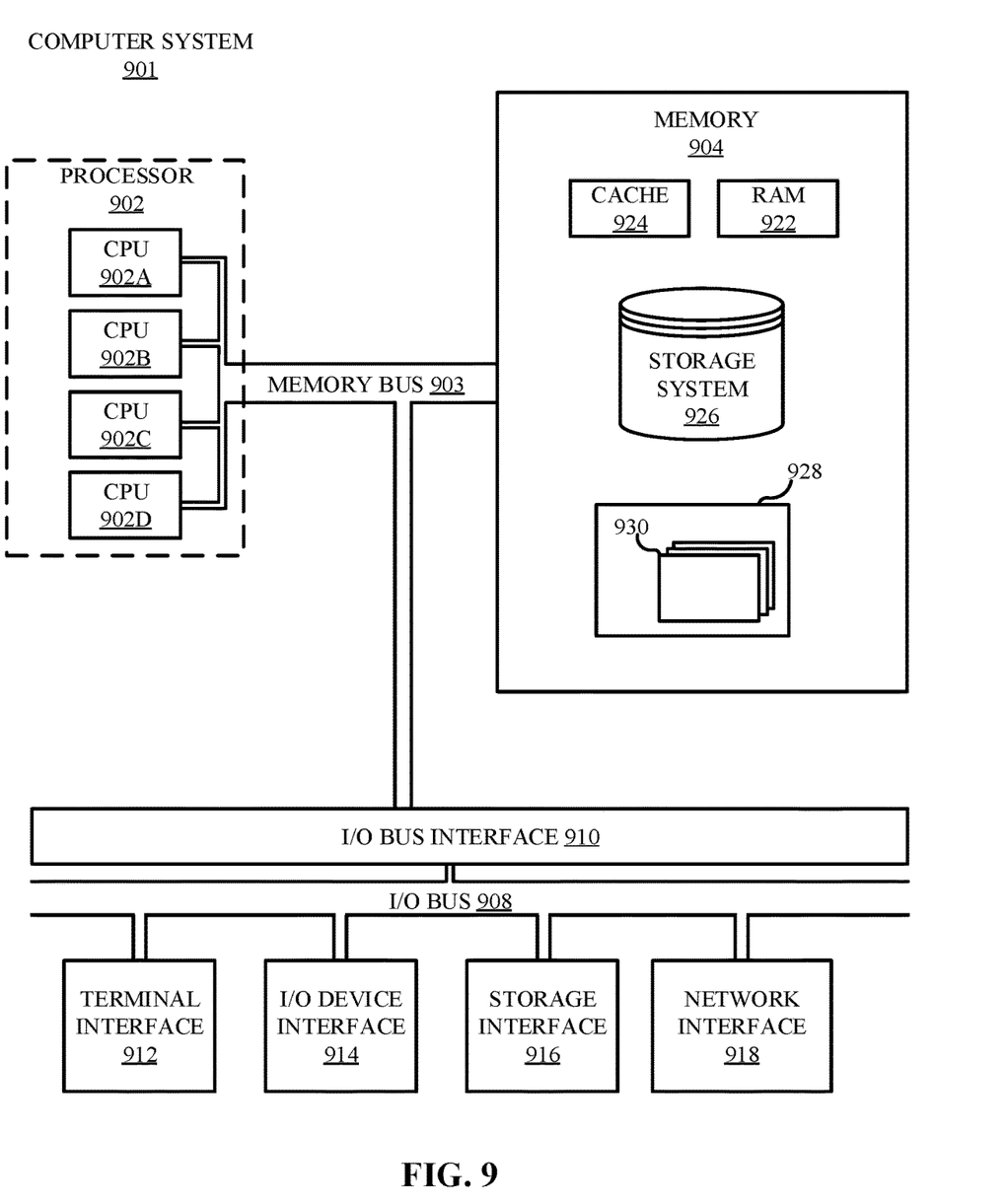
FIG. 9 illustrates a high-level block diagram of an example computer system that may be used in implementing one or more of the methods, tools, and modules, and any related functions, described herein, in accordance with embodiments of the present disclosure.

Referring now to FIG. 9, shown is a high-level block diagram of an example computer system 901 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable central processing units (CPUs) 902A, 902B, 902C, and 902D, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) can refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list might be needed. In other words, "at least one of" means any combination of items and number of items might be used from the list, but not all of the items in the list are required. The item can be a particular object, a thing, or a category.

For example, without limitation, "at least one of item A, item B, and item C" can include item A, item A and item B, or item B. This example also can include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A system for determining code ancestry, comprising:
a memory; and
a processor communicatively coupled to the memory, wherein the processor is configured to perform a method comprising:
receiving a source code file;
parsing a plurality of functions out of the source code file;
sanitizing each of the plurality of functions by applying specific filtering to each of the plurality of functions, stripping unnecessary components from the source code file, and producing structure data and sanitized data;
generating a plurality of fuzzy fingerprints from the plurality of functions, including generating separate fuzzy fingerprint signatures for both the structure data and the sanitized data of each of the plurality of functions that represent the plurality of functions;
storing the plurality of fuzzy fingerprints in a graph database;
comparing each of the plurality of fuzzy fingerprints to another one of the plurality of fuzzy fingerprints by applying fuzzy matching to determine a similarity;
determining whether the plurality of fuzzy fingerprints include portions of the source code file that are a direct match, a variation, a derivative, or not a match by comparing the similarity to a threshold; and
establishing an ancestry of the portions of the source code file based on the determining.

2. The system of claim 1, wherein the sanitizing step includes stripping unnecessary components from the functions.

3. The system of claim 1, wherein the processor is further configured to perform the method further comprising:
using a graph-traversing algorithm to identify temporal and spatial relationships between the functions based on their corresponding fuzzy fingerprints in the graph database.

4. The system of claim 3, wherein the processor is further configured to perform the method further comprising:
storing the temporal and spatial relationships between the functions identified by the graph database in a secondary database.

5. The system of claim 2, wherein the processor is further configured to perform the method further comprising:
comparing the temporal and spatial relationships between the functions to the threshold to determine the similarity.

6. The system of claim 1, wherein the parsing step includes recognizing a filetype and a programming language of the source code file.

7. The system of claim 1, wherein the graph database is configured to generate a graph from temporal and spatial relationships between the fuzzy fingerprints using a graph-traversing algorithm.

8. A computer program product for software analysis using fuzzy fingerprinting to determine code ancestry, the computer program product comprising one or more computer readable storage media having program instructions embodied therewith, the program instructions executable by a device to cause the device to:
receive a source code file of a computer program;
parse a plurality of functions out of the source code file;
sanitize each of the plurality of functions by applying specific filter ring to each of the plurality of functions, stripping unnecessary components from the source code file, and producing structure data and sanitized data;
generate a plurality of fuzzy fingerprints from the plurality of functions, including generating separate fuzzy fingerprint signatures for both the structure data and the sanitized data of each of the plurality of functions that represent the plurality of functions;
store the plurality of fuzzy fingerprints in a graph database;
compare each of the plurality of fuzzy fingerprints to another one of the plurality of fuzzy fingerprints by applying fuzzy matching to determine a similarity;
determine whether the plurality of fuzzy fingerprints include portions of the source code file that are a direct match, a variation, a derivative, or not a match by comparing the similarity to a threshold; and
establish an ancestry of the portions of the source code file based on the determining.

9. The computer program product of claim 8, wherein the program instructions cause the device to use a graph-traversing algorithm to identify temporal and spatial relationships between the functions based on their corresponding fuzzy fingerprints in the graph database.

10. The computer program product of claim 9, wherein the program instructions cause the device to store the temporal and spatial relationships between the functions identified by the graph database in a secondary database.

11. The computer program product of claim 9, wherein the program instructions cause the device to compare the temporal and spatial relationships between the functions to the threshold to determine the similarity.

12. A method for determining code ancestry, comprising:
receiving a source code file;
parsing a plurality of functions out of the source code file;
sanitizing each of the plurality of functions by applying specific filtering to each of the plurality of functions, stripping unnecessary components from the source code file, and producing structure data and sanitized data;
generating a plurality of fuzzy fingerprints from the plurality of functions, including generating separate fuzzy fingerprint signatures for both the structure data and the sanitized data of each of the plurality of functions that represent the plurality of functions;
storing the plurality of fuzzy fingerprints in a graph database;
comparing each of the plurality of fuzzy fingerprints to another one of the plurality of fuzzy fingerprints by applying fuzzy matching to determine a similarity;
determining whether the plurality of fuzzy fingerprints include portions of the source code file that are a direct match, a variation, a derivative, or not a match by comparing the similarity to a threshold; and
establishing an ancestry of the portions of the source code file based on the determining.

13. The method of claim 12, wherein the sanitizing step includes stripping unnecessary components from the functions.

14. The method of claim 12, further comprising:
using a graph-traversing algorithm to identify temporal and spatial relationships between the functions based on their corresponding fuzzy fingerprints in the graph database.

15. The method of claim 14, further comprising:
storing the temporal and spatial relationships between the functions identified by the graph database in a secondary database.

16. The method of claim 14, further comprising:
comparing the temporal and spatial relationships between the functions to the threshold to determine the similarity.

17. The method of claim 12, wherein the parsing step includes recognizing a filetype and a programming language of the source code file.

* * * * *